United States Patent Office 3,239,568
Patented Mar. 8, 1966

3,239,568
MANUFACTURE OF ALKALI METAL
COMPOUNDS
David O. De Pree and James D. Johnston, Baton Rouge,
La., assignors to Ethyl Corporation, New York, N.Y.,
a corporation of Virginia
No Drawing. Filed Aug. 9, 1960, Ser. No. 48,356
6 Claims. (Cl. 260—632)

This invention involves a process for the manufacture of organic compounds, in particular, alkali metal alkoxides, which can easily be converted to the corresponding alcohols. This invention is also concerned with bimetallic organometallic compounds which are utilized in preparing the alkali metal alkoxides of this invention.

Prior to this invention no satisfactory method was known for increasing the molecular weight of metal alkoxides using direct reactions of organic halides or organic sulfates. A process which employs hydrocarbon halides or hydrocarbon sulfates, and in particular, long chain hydrocarbon halides, to produce alkali metal alkoxides of increased chain length would be of particular value to the industry in providing a method for ultimately producing the useful higher chain alcohol itself. Such a process has now been discovered. It is simple and economical, and in its preferred form it utilizes readily available, low cost hydrocarbon halide starting materials.

Accordingly, it is an object of this invention to provide a new and novel process for the direct preparation of alkali metal alkoxides of increased molecular weight. A particular object is to provide a process for the direct preparation of alkali metal alkoxides of increased molecular weight from a reaction between an alkali metallometallic alkoxide and a hydrocarbon halide. A still further object is to porvide a process for the preparation of alcohols of increased molecular weight. Also an object of this invention, is to provide a process for the perparation of the alkali metallometallic alkoxide utilized in the reaction with a hydrocarbon halide to prepare alkali metallic alkoxides of increased molecular weight. Other objects of this invention will be apparent from the following discussion.

These and other objects of this invention are accomplished by providing a process for the preparation of alkali metal alkoxides of increased molecular weight which comprises reacting an alkali metallometallic alkoxide with an alkylating agent, viz. hydrocarbon halide or a hydrocarbon sulfate.

Also within the scope of this invention is a process for the preparation of the above alkali metallometallic alkoxide which comprises reacting an alkali metal alkoxide wtih a metalating agent at a temperature below the decomposition temperature of the alkoxides formed and used as the reactant. In this embodiment alkali metals, alkali metal hydrides, or alkali metal amides are used as the metalating agent.

The term alkali metallometallic alkoxide, as used herein, defines a bifunctional organometallic compound. One of the functional groups of this bifunctional compound is an alkali metal bonded directly to a carbon atom of the alkoxide, i.e.

and the other functional group is a metal bonded directly to the oxygen atom of said alkoxide, i.e.

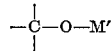

In the term alkali metallometallic alkoxide the constituent designated as "metallo" is the alkali metal bonded directly to a carbon atom and that designated as "metallic" is the metal atom bonded to the oxygen atom of the alkoxide molecule.

Thus the alkali metallometallic alkoxides of this invention are bifunctional compounds—that is they contain two reactive centers. One of the striking features of this invention is that in a reaction with a hydrocarbon halide or hydrocarbon sulfate alkylating agent only the "metallo," i.e.

functional group reacts, and the "metallic," i.e.

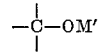

reactive center does not.

Although the terms alkali metallometallic alkoxide and metal alkoxide are employed throughout this specification the process of this invention can be carried out using the corresponding alkenoxides and aryloxides, as these compounds are essentially equivalent to alkoxides for the purposes of this invention.

In carrying out the processes of this invention, it is preferred that the alkali metal alkoxide and alkali metallometallic alkoxide contain sodium as the alkali metal constituent because of its ready availability, cheapness and high reactivity. Furthermore, in order to produce the most desirable alkali metal alkoxides from cheap raw materials having good reactivity it is preferred that the hydrocarbon portion of the alkylating agent contain from about 6 to about 20 carbon atoms and that the alkali metallometallic alkoxide reactant contain from 1 to about 4 carbon atoms. Thus the alkali metal alkoxides produced from these reactants by the process of this invention contain about 7 through about 24 carbon atoms. A more specific embodiment of this invention, and more fully demonstrative thereof, is the reaction of sodio-sodium methoxide with octyl bromide to produce sodium nonoxide, which can be converted by hydrolysis to nonyl alcohol.

In carrying out the reaction between an alkali metallometallic alkoxide and said alkylating agents, the proportions of the reactants employed, and the temperature of the reaction are important and should preferably be maintained within certain limits in order to achieve the desired alkali metal alkoixdes of increased molecular weight in high yields and purity. In general between about 1 and 1.5 equivalents of the alkoxide are employed per equivalent of hydrocarbon halide or hydrocarbon sulfate. The equivalent number of said halide is equal to the number of carbon-halogen bonds contained therein; that of said sulfate is equal to the number of carbon-sulfur bonds contained therein, and said alkoxide has an equivalent number equal to the number of carbon-metal bonds therein. In order to avoid excessive by-product formation and to achieve high yields, it is preferred to employ essentially stoichiometric (i.e. equal equivalent) proportions of the reactants based on one equivalent of hydrocarbon halide or hydrocarbon sulfate for each equiavalent of the alkali metallometallic alkoxide. The reaction temperature employed is at least about −30° C. up to about the decomposition temperature of the reactants. However, it is generally preferred to employ a reaction temperature of at least about 50° C. but below the decomposition temperature of the alkali metallometallic alkoxide in order to achieve a faster reaction rate and higher yields. Thus the process of this invention provides a direct route to alkali metal alkoxides of increased molecular weight from hydrocarbon halides. The product thereby produced can be easily converted to the alcohol, or other valuable products.

The alkali metallometallic alkoxides of this invention are produced by a novel process which comprises reacting an alkali metal alkoxide with a metalating agent selected from the group consisting of alkali metals, alkali metal hydrides and alkali metal amides at a temperature below the decomposition temperature of said alkoxides. The alkali metal alkoxide which is preferably employed in this process is one which contains at least one hydrogen atom on the alpha-carbon atom. Illustrative of such alkoxides are sodium methoxide, sodium ethoxide, sodium butoxide and the like. Alkali metallometallic alkoxides produced from such metal alkoxides have greater stability and thus give greater processing flexibility in the reaction with the hydrocarbon halide or hydrocarbon sulfate. The preferred metalating agents for use in preparing the alkali metallometallic alkoxides are sodium, sodium amide and sodium hydride because of their cheapness, availability or ease of preparation. Therefore, within the scope of this invention and a preferred embodiment thereof is a process for the preparation of α-sodio-sodium alkoxides which comprises reacting a sodium alkoxide, containing at least one hydrogen atom on the α-carbon atom, with a metalating agent selected from the group consisting of sodium, sodium amide and sodium hydride at a temperature below the decomposition temperature of said alkoxides.

In general the reaction to produce alkali metallometallic alkoxides is carried out in the absence of a solvent, at a temperature ranging from about 50° to the decomposition temperature of the product produced and in the presence of good mixing or grinding, such as is obtained in a ballmill reactor.

It is preferred to employ substantially stoichiometric proportions of the reactants when carrying out the metalation reaction. By stoichiometric proportions is meant about 1 equivalent of the metalating agent per equivalent of metal alkoxide. It is also preferred that the reactants be preponderantly anhydrous and, when a solid, preferably of a small particle size generally less than 100 microns. Additionally the starting materials should be essentially free of organometallic compounds or compounds that would form organometallic compounds, other than the product desired. In one embodiment the reactants are mixed and ground in a ballmill reactor under an inert atmosphere and volatile by-products are continuously removed. The desired alkali metallometallic alkoxide is thereafter recovered from the ballmill reactor.

A particular advantage of this novel process for preparing alkali metallometallic alkoxides is that the desired product is obtained substantially in its pure form and in high yield. Another advantage of this process is that it employs only one equivalent of metal of such cheap metalating agents as, for example, sodium.

The novel reaction of an alkali metallometallic alkoxide with a hydrocarbon halide or sulfate is more fully demonstrated by the following examples. In these examples all parts and percentages are by weight unless otherwise specified.

*Example I*

To a reaction vessel provided with means for heating, cooling, refluxing, stirring, addition of reactants and for introduction of an inert atmosphere is added 1 mole of sodio-sodium methoxide as a 20 percent suspension in mineral oil. This mixture is heated to about 50° C. and thereafter 0.5 mole of 1,4-dichlorobutane is added over a period of 2 hours. Upon completion of the addition, the temperature is raised to 100° C. for ½ hour to complete the reaction. The reaction mixture is then cooled and the solids (the sodium salt of 1,6-hexane diol and sodium chloride) are filtered under nitrogen atmosphere and, while maintaining the inert atmosphere, are hydrolyzed with water. The water solution is fractionated by first removing the water and then distilling the product produced (1,6-hexane diol) over at about 250° C. The product is a solid at 25° C. and melts at 42° C.

*Example II*

To the reaction vessel described in Example I is added 1 mole of sodio-sodium methoxide as a 20 percent suspension in n-octane. To this mixture is added slowly over a period of about 2 hours n-octylbromide, the temperature of the reaction mixture being maintained at about 25° C. After the addition is completed the temperature of the reaction mixture is raised to about 100° C. and held there for about ½ hour to complete the reaction. The reaction mixture is cooled and the solids (the sodium salt of n-nonyl alcohol and sodium bromide) are filtered off and hydrolyzed as in Example I. The water insoluble alcohol product (n-nonyl alcohol) is separated as a liquid. This material is then fractionated at atmospheric pressure and a fraction boiling at about 230° C. is collected and identified as n-nonyl alcohol, a water insoluble, colorless liquid melting at −5° C.

*Example III*

To a reaction vessel as described in Example I is added 2 moles of α-sodio-sodium 2-butenoxide as a 20 percent suspension in mineral oil. The temperature of this mixture is raised to about 50° C. and thereafter the one mole of diethyl sulfate is added slowly over a period of about 1 hour after which addition the temperature of the reaction mixture is then raised to 150° C. for a period of about ½ hour in order to complete the reaction. Then the reaction mixture is cooled, filtered under nitrogen and the solids (the sodium salt of 4-hydroxy-2-hexene and sodium sulfate) hydrolyzed. The product, 4-hydroxy-2-hexene is thereby obtained.

*Example IV*

To a reaction vessel, as described in Example I, is added 1 mole of sodio-sodium phenoxide as a 20 percent suspension in n-octane. The temperature of this mixture is raised to about 50° C. and thereafter one mole of allyl chloride is added slowly over a period of about 2 hours. Upon completion of the addition, the reaction mixture is heated to about 100° C. for about 45 minutes and thereafter cooled to about 25° C. The reaction mixture containing the sodium salt of p-allyl phenol is then hydrolyzed and the organic layer separated. The solvent is then distilled off from the organic layer to leave a crystalline residue. This residue is then recrystallized from ethanol and the product p-allyl phenol is obtained.

*Example V*

To a reaction vessel provided with means for heating, cooling, stirring, refluxing, continuous addition of reactants and introduction of inert atmosphere is added 2 moles of α-sodio-sodium ethoxide as a 20 percent suspension in mineral oil. The reaction mixture is cooled to −30° C. and one mole of dimethyl sulfate added thereto. This temperature is maintained for a period of 2 hours to complete the reaction. The reaction mixture containing the sodium salt of isopropyl alcohol is hydrolyzed with 2 moles of water, followed by fractionation of the alcohol product from the mineral oil diluent. In this manner is produced isopropyl alcohol, a colorless liquid having a melting point of −88° C. and a boiling point of 82.3° C.

In addition to the hydrocarbon halides and hydrocarbon sulfates employed in the above examples other hydrocarbon halides and hydrocarbon sulfates can be employed in this invention. In general halogen, or sulfate, containing aliphatic, cycloaliphatic and aromatic hydrocarbons, usually containing up to about 20 carbon atoms, can be employed. Therefore the aliphatic halides and aliphatic sulfates can contain 1–20 carbons; the cycloaliphatic halides and cycloaliphatic sulfates, 3–20 carbons; and the aryl halides and aryl sulfates, 6–20 carbon atoms. The halogens contained in the hydrocarbon halide can be fluorine, chlorine, bromine, iodine and asitine— although the last is rarely employed for economic reasons. In most cases the halides of this invention contain 1-2 halogens which preferably are chlorine or bromine or both because of their reactivity and low cost.

To more fully demonstrate the process for preparing alkali metallometallic alkoxides the following examples in which all parts and percentages are by weight are presented.

*Example VI*

Into a ballmill, provided with means for heating and having about a 30 percent ball charge (total apparent volume of mill occupied by the balls) and, furthermore, having means for removal of off gas, are added 200 parts of anhydrous sodium chloride and 46 parts of sodium metal. This mixture is heated and ground to about 150° C. for ½ hour and thereafter cooled to 25° C. Thereafter, 32 parts of methanol is added under nitrogen atmosphere, while grinding is effected over a period of 1 hour. After this time hydrogen evolution ceases and the mill is then heated with grinding to 170° C. with evolution of additional hydrogen. The mill is then cooled and the product sodio-sodium methoxide is removed from the ballmill in good yield and purity.

*Example VII*

A ballmill equipped with means for heating, removal of off gas and having approximately a 30 percent ball charge is charged with about 1.4 moles of sodium amide and 1 mole of sodium 2-butenoxide. Heating and grinding is commenced and the temperature is maintained at about 120° C. to about 180° C. for a period of 2 hours.

The ballmill is then shut down and cooled and the product α-sodio-sodium 2-butenoxide is obtained in good yield.

*Example VIII*

To a ballmill, as described in Example VI, is added 200 parts of sodium chloride, 46 parts of sodium. The materials are mixed and ground while introducing hydrogen at a temperature of about 200° C. to 300° C. When hydrogen uptake ceases the mill is cooled and 74 parts butanol are added under grinding at about 25° C., this temperature being maintained until hydrogen evolution ceases. The reaction mixture is then heated under grinding to about 180° C. until the newly commenced hydrogen evolution ceases. The mill is then shut down and cooled and the product α-sodio-sodium butoxide is removed.

*Example IX*

To a reaction vessel provided with means for heating, stirring, cooling, refluxing, addition of reactants and venting of off gases, is added 2 moles of sodium amide as a 20 percent suspension in a mineral oil solvent. This mixture is heated to about 30° C. and one mole of decanol is added under high speed stirring over a period of about ½ hour. The reaction temperature is then raised to about 100° C. and maintained at this temperature for a period of 2 hours. Thereafter the reaction mixture is cooled, filtered to obtain the desired product α-sodio-sodium decoxide.

*Example X*

A ballmill provided with means for heating and removal of off gases is charged with one mole of sodium phenoxide and one mole of sodium. Heating and grinding is commenced and the temperature raised and maintained at approximately 200° C. for a period of 2 hours. Thereafter the ballmill is shut down, the product cooled and the desired product, sodio-sodium phenoxide, is obtained in good yields.

Although it is generally preferred to employ the metal alkoxide as described hereinabove it is now obvious that the free alcohol can also be employed to produce the metal alkoxide in situ. Such an embodiment, although utilizing 2 equivalents of metal per each equivalent of metallated product produced, nevertheless, only employs one equivalent of metal in the metalation of a carbon atom. Thus this embodiment is consistent with the stoichiometry described hereinbefore.

The hydrocarbon halides and hydrocarbon sulfates employed pursuant to this invention include alkyl halides, aralkyl halides, alkenyl halides, aralkenyl halides, cycloalkyl halides, cycloalkenyl halides, aryl halides, akaryl halides and the like hydrocarbon halides as well as the corresponding hydrocarbon sulfates. In the preferred cases the hydrocarbon halide is one which has at least one hydrogen atom on the halogen substituted carbon atom since these halides exhibit good stability and reactivity. The hydrocarbon halides and hydrocarbon sulfates of this invention can be methyl chloride, dimethyl sulfate, ethyl bromide, diethyl sulfate, 1-propyl fluoride, di-1-propyl sulfate, 2-butyl iodide, di-2-butyl sulfate, 2-pentyl astatide, di-2-phenyl sulfate, 1-eicosyl chloride, and di-1-eicosyl sulfate; and the branched chain derivatives thereof; dichloromethane, dibromoethane, diethyl sulfate, 1,3-diiodobutane, di-butyl sulfate, 1,5-difluoroeicosane, trichloromethane; 1,4,10-triiodoeicosane; also mixed alkyl halides such as the chlorobromoethanes and the like; mixed hydrocarbon sulfates like methylethylsulfate, n-propyl-n-butyl sulfate and the like; alkenyl halides and alkenyl sulfates such as 3-chloro-1-propene, di-1-propenyl sulfate, 4-bromo-1-decaptene, di-1-decapentenyl sulfate; 4,6-dichloro-1-hexane, di-1-hexenyl sulfate; 3,3,4-trichloro-1-butene, di-1-butenyl sulfate, 20-chloro-1-eicosene, di-1-eicosenyl sulfate, and the like.

Illustrative of the cyclic halides and cyclic sulfates used in this invention are 1-chlorocyclopentane, dicyclopentyl sulfate; 1,4-dichlorocyclohexane, dicyclohexyl sulfate; 1,3,7-tribromocyclooctane, dicyclooctyl sulfate, 1-iodocyclobutane, dicyclobutyl sulfate, 1-fluorocyclopentane, 4-(2-chlorododecyl) octyl chloride, cyclopentadienyl chloride, dicyclopentadienyl sulfate, cyclohexadienyl iodide, cyclohexadienyl sulfate, cyclooctadienyl dichloride, dicyclooctadienyl sulfate, 3-chloro-1-cyclohexyne, dicyclohexynyl sulfate, 2-phenyl-1-chloroethane, di-2-phenylethyl sulfate, chlorobenzene, diphenyl sulfate, iodobenzene, bromonaphthalenes, naphthyl sulfates, chlororanthracenes, anthracyl sulfates, benzyl chloride, dibenzyl sulfate p-methyl chlorobenzene, 2-(2-chloroethyl)-8-octanaphthalene, 1-chloro-2-butenyl benzene, and the like. The hydrocarbon halides and hydrocarbon sulfates for use in practicing this invention can be substituted as well as unsubstituted. When substituted, the substituents are groups which activate the hydrocarbon halide or hydrocarbon sulfate. Such activating groups are ether, sulfate, tert-amino, tert-phosphino, tert-arsino, thio ethers, silyl, stannyl, plumbyl, nitrosyl, and the like.

A preferred class of hydrocarbon halides for use in this invention are those which are resistant to dehydrohalogenation, such as hydrocarbon halides having at least one hydrogen on the halogen substituted carbon atom. This class of dehydrohalogenation resistant hydrocarbon halides finds particular applicability in the instant process when higher temperatures are employed, viz. temperatures substantially above 140° C. Typical, but non-limiting examples of these preferred hydrocarbon halides include benzyl chloride, n-butyl bromide, allyl chloride, octyl bromide, hexenyl chloride, beta-cyclohexylethyl bromide, octenyl chloride and the like hydrocarbon halides having up to about 18 carbon atoms, and similar compounds in which the halide is chlorine, bromine, iodine or fluorine. In this class of organic halides, the iodides and bromides are especially preferred since they are more resistant to dehydrohalogenation. Many other examples will be evident to those skilled in the art. Thus, in any of the examples presented above, hexenyl chloride, n-butyl bromide, allyl chloride and the like can be substituted for the hydrocarbon halide employed in the reaction with the attainment of similar results.

In addition to the hydrocarbon halides and hydrocarbon sulfates discussed above, the process of this invention employs novel alkali metallometallic alkoxides. These alkali metallometallic alkoxides are more fully demonstrated by the following illustrative formula:

$$(MRO)_xM'$$

wherein M and M' are alkali metals and furthermore M' can in addition be a polyvalent metal such as the alkaline earth metals, the III–A metals (Periodic Chart of the Elements, Fischer Scientific Company, 1955)—in short M' can be any alkali or polyvalent metal which will form a metal alkoxide. R is a hydrocarbon group, in most cases being an alkyl, aryl or alicyclic radical, containing from about 1 through about 20 carbon atoms; and $x$ is an integer equal to the valence of the metal M'. It should be noted that although M' can be a polyvalent metal, as defined above, it is especially preferred that M' be an alkali metal which can be the same or different from the alkali metal M. (By metal is meant all the metals of Group I-A of the Periodic Chart of the Elements.) The reason for this preference is due to the comparative ease with which the alkali metal alkoxides can be formed and, furthermore, due to the generally wide availability and low cost of such alkali metals as sodium which is herein especially preferred. It is preferred that the hydrocarbon group, R, contain 1 through 4 carbon atoms because of the cheapness and ready availability of the alcoholate starting materials used in preparation of metallometallic alkoxides of such carbon content.

A preferred embodiment of this invention is the employment of an alkali metallometallic alkoxide reactant in a reaction with an alkylating agent of this invention wherein said reactant has the metal, M, substituted on the terminal carbon atom. Such alkali metallometallic alkoxides, when reacted with the hydrocarbon halide or hydrocarbon sulfate alkylating agents produce highly desirable primary metal alkoxides. When the metal M is substituted on the carbon atom other than a terminal carbon atom, secondary and tertiary metal alkoxides are produced.

A special class of alkali metallometallic alkoxides is demonstrated by the following general formula:

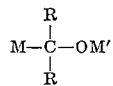

wherein M and M' are alkali metals and can be the same or different, and R is a hydrogen or a hydrocarbon group, as defined hereinabove. These alkali metallometallic alkoxides are preferred because of their stability and high reactivity in a reaction with a hydrocarbon halide or a hydrocarbon sulfate. More fully illustrative of this latter class of alkali metallometallic alkoxides are sodio-sodium methoxide, α-sodio-sodium ethoxide, α-sodio-sodium propoxide, α-sodio-sodium butoxide, α-sodio-sodium decoxide, α-sodio-sodium-eicosoxide, α-sodio-potassium methoxide, α-potassio-lithium propoxide, α-sodio-rubidium ethoxide, α-sodio-cesium ethoxide, α-rubidio-sodium hexoxide and the like.

The metal amides used in this invention to form the above described metallometallic alkoxides can be represented by the following general formula:

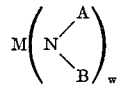

wherein M is an alkali metal, A and B can be the same or different and are hydrogen or lower alkyl radicals, and $w$ is a small whole number. These metal amide derivatives are readily prepared by reacting an amine with the metal in the presence of a conjugated polyene. For example, N-sodium propyl amide is prepared by reacting n-propyl amine with finely divided sodium in the presence of butadiene. In general, it is preferred to employ lower alkyl radicals which form an amine derivative in the reaction which boils at about 100° C. or less and is relatively stable under reaction conditions. Thus, for example, A and B can be the radicals methyl, ethyl, isopropyl, and the like. The use of the metal amides, or the substituted metal amides, which will result in a derivative having a boiling point below about 100° C. and is comparatively stable under reaction conditions is preferred since the derivative can be readily and rapidly removed from the reaction mixture. Rapid removal of the derivative maintains the course of the reaction toward the formation of the metallometallic alkoxide.

Illustrative of these metal amides are lithium amide, sodium amide, potassium amide, rubidium amide, cesium amide and francium amide; lower alkyl amides such as N-sodium propyl amide, N-sodium dimethylamide, N-lithium butyl amide, N-potassium diethylamide and the like.

Alkyl metal hydrides utilized in the metallation process of this invention are metal hydrides such as sodium hydride, potassium hydride, rubidium hydride, cesium hydride, lithium hydride and francium hydride.

In addition to alkali metal amides and alkali metal hydrides, the alkali metals form a third class of metalating agents utilized in the process of this invention. These alkali metal metalating agents are the metals of Group I-A of the Periodic Chart of the Elements (Fischer Scientific Company, 1955) and include lithium, sodium, potassium, rubidium, cesium and francium, with sodium being the most highly preferred.

In preparing alkali metallometallic alkoxides, the metalation is conducted at a temperature sufficient to initiate the reaction, generally about 50° C. up to the decomposition temperature of the metal alkoxide utilized in the reaction (generally temperatures no higher than 300° C. are utilized). It is preferred to conduct the reaction at a temperature ranging from about 70° C. to about 200° C. In some cases it is desirable to employ temperatures approaching the decomposition temperature of the product produced, i.e. within about 30 degrees of said decomposition temperature. This is especially true in the case where a metal hydride is employed as the reactant. Furthermore, an excess of either reactant (i.e. metalating agent or metal alkoxide) can be employed. However, if an excess of one of the reactants is employed it is preferable that the metal alkoxide be in excess so that the metalating agent will be essentially quantitatively consumed. However, generally it is preferred to employ a stoichiometric proportion of the reactants up to a small excess (e.g. up to about 1.4 to 1 equivalents of alkoxide to metalating agent) for economic reasons. By stoichiometric quantities is means one equivalent of substitutable hydrogen in the metal alkoxide reactant per equivalent of metal in the metalating agent.

In preparing alkalimetallometallic alkoxides, the particle sizes of the reactants is very important. In general, it is preferred to employ particle sizes below about 100 microns and usually below about 50 microns. The smaller the particle size, the shorter the reaction period. Thus, best results are obtained when the particle size of the reactants is less than 10 microns. In conducting the process, the reactants can be preground and premixed and fed continuously to a heated surface. However, it is preferred to conduct the reaction while grinding and mixing the reactants and applying heat. Thus, it should be understood that the reactants need not be preground or premixed, but can be fed to the reactor separately in larger particle sizes and mixed and ground in situ. This is particularly described when the agitation provided in the reactor is of the type to provide grinding of the reaction mixture during the course of the reaction. Employing the technique of the grinding along with the agitation provides more complete reaction. One highly preferred method of doing this is to employ a ballmill as a reactor, although any tumbling mill can be employed such as a pebble mill, rod mill, tube mill or compartment mill. Other milling apparatus which will now be evident to those skilled in the art can be also employed.

Preparation of alkali metallometallic alkoxides should be conducted in an inert atmosphere such as argon, nitrogen, krypton, and the like. It is preferable that the inert atmosphere be pre-purified so as to be substantially free of impurities such as oxygen and moisture, since these impurities may be taken up in the product. For some purposes it is desirable to conduct the reaction under an inert liquid blanket. One of the purposes of such an embodiment is to avoid oxygen contamination by impurities in the flushing gas. This inert liquid blanket is generally a high boiling paraffinic hydrocarbon such as mineral oil. The reaction is also conducted at atmospheric or sub-atmospheric pressures. Sub-atmospheric pressures have the advantage of enhancing removal of any volatile by-products thus obtaining more rapid reaction and more complete shifting of the equilibrium.

The process for preparing alkali metallometallic alkoxides is admirably suited to continuous methods. For example, the reactants separately or together in the proper proportions are continuously ground to desired particle size, transmitted to a heated movable reactor surface, the volatile by-product is removed and recovered for recycling to the preparation of the metal amide or derivative thereof, and the product is continuously discharged from the reactor. This and other modifications will now be evident to those skilled in the art.

In reacting the above described alkali metallometallic alkoxides with a hydrocarbon halide or hydrocarbon sulfate to produce metal alkoxides of increased molecular weight, temperatures ranging from about $-30°$ C. up to the decomposition temperature of the alkoxides are employed. (Generally, temperatures no higher than $200°$ C. however are employed.) Furthermore, the pressure of the reaction is not critical except in that pressure provides a convenient means for obtaining in certain instances desired temperature conditions. Thus atmospheric pressure can be utilized and other pressures have no particular effect upon the reaction. Sub-atmospheric and super-atmospheric pressures can however be employed.

As indicated in the examples, diluents are generally employed in carrying out this embodiment of the invention. Such diluents ordinarily are not required when the hydrocarbon halide or hydrocarbon sulfate is a liquid. However, for more efficient agitation and contact of the reactants, diluents are generally employed. The criteria for choice of diluents are that they be liquid under the reaction conditions and substantially inert to the reactants. Such diluents are paraffinic hydrocarbons such as mineral oil petroleum ether, etc. Other typical examples are pentanes, octanes and the like containing up to about 18 carbon atoms.

The proportions of alkylating agent and alkalimetallometallic alkoxide employed generally range from stoichiometric up to a small excess of the alkali metallometallic alkoxide. By stoichiometric proportions is meant approximately one equivalent of metal as the metallo substituent of the metallometallic alkoxide to one equivalent of the hydrocarbon halide or hydrocarbon sulfate. When an excess of the alkoxide is employed generally no greater excess than about 1.5:1 equivalents of alkoxide to hydrocarbon halide or hydrocarbon sulfate are utilized.

The metal alkoxides of increased molecular weight prepared by the process of this invention are of considerable and wide-spread utility. As discussed above these metal alkoxides can be hydrolyzed to produce alcohols of increased molecular weight. They can also be utilized in the preparation of detergents or as monomers in the preparation of high molecular weight polymeric structures. The unsaturated metal alkenoxides can be polymerized to form polyethylenic type polymers with long chain alcoholate functional groups as side chains on the polymer. The metal alkoxides can also be reacted to form high molecular weight esters employing conventional esterification techniques.

Having described the process of the present invention it is not intended that it be limited except as set forth in the following claims.

We claim:

1. A process for the preparation of an alkali metal alkoxide which comprises contacting under inert, substantanially anhydrous and oxygen-free conditions an alkali metallometallic alkoxide with an alkylating agent; at a temperature ranging from about $-30°$ C. up to the decomposition temperature of the alkali metallometallic alkoxide; said alkali metal alkoxide so produced having the formula

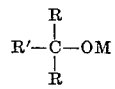

said alkali metallometallic alkoxide having the formula

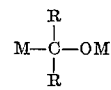

and said alkylating agent having the formula

wherein R is selected from the group consisting of hydrogen and alkyl radicals containing from 1 to about 20 carbon atoms, R' is a hydrocarbon radical containing from 1 to about 20 carbon atoms, M is an alkali metal and X is selected from the group consisting of halide radicals and the sulfate radical.

2. A process for the preparation of an α-alkylated alkali metal alkoxide which comprises contacting under inert, substantially anhydrous and oxygen-free conditions an alkali metal alkoxide having a hydrogen atom on the α-carbon atom with a metalating agent selected from the group consisting of (1) alkali metals, (2) alkali metal halides, and (3) alkali metal amides at a temperature of from about $50°$ C. up to the decomposition temperature of said alkoxide, said metalating agent and said alkoxide having a particle size below about 100 microns, and thereafter contacting the alkali α-metallometallic alkoxide thereby produced with an alkylating agent selected from the group consisting of hydrocarbon halides and hydrocarbon sulfates at a temperature ranging from about $-30°$ C. up to the decomposition temperature of the alkali α-metallo-metallic alkoxide.

3. A process for the preparation of an alkali α-metallometallic alkoxide which comprises contacting an alkali metal alkoxide having a hydrogen atom on the α-carbon atom with a metalating agent selected from the group consisting of (1) alkali metals, (2) alkali metal hydrides, and (3) alkali metal amides at a temperature of from about $50°$ C. up to the decomposition temperature of said alkoxide and under inert, substantially anhydrous and oxygen-free conditions said metalating agent and said alkali metal alkoxide having a particle size below about 100 microns.

4. A process for the preparation of sodium alkoxides which comprises contacting under inert, substantially anhydrous and oxygen-free conditions a sodio-sodium-alkoxide with an alkylating agent at a temperature ranging from about $-30°$ C. up to the decomposition temperature of said sodio-sodium-alkoxide; said sodium alkoxide so produced having the formula

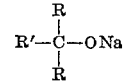

said sodio-sodium-alkoxide having the formula

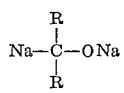

said alkylating agent having the formula

R′X wherein R is selected from the group consisting of hydrogen and alkyl radicals containing from 1 to about 40 carbon atoms, R′ is a hydrocarbon radical containing from about 6 to about 20 carbon atoms and X is a halide radical.

5. A process for the preparation of nonyl alcohol which comprises contacting sodio-sodium methoxide with octyl bromide under inert, substantially anhydrous and oxygen-free conditions at a temperature ranging from about −30° C. up to the decomposition temperature of said sodio-sodium-methoxide to form sodium nonoxide and thereafter contacting said nonoxide with water, said process being conducted at a temperature of up to about 100° C.

6. A process for the preparation of an α-sodio-sodium alkoxide which comprises contacting under inert, substantially anhydrous and oxygen-free conditions a sodium alkoxide containing a hydrogen atom on the α-carbon atom with sodium at a temperature of from about 50° C. up to below the decomposition temperature of said alkoxide, said sodium and said sodium alkoxide having a particle size below about 100 microns.

References Cited by the Examiner

UNITED STATES PATENTS 2,069,403  2/1937  Cunningham.
2,715,057  8/1955  Pryde.
2,873,290  2/1959  Esmay et al.

OTHER REFERENCES

Bruhl et al.: "Ber. Deut. Chem.," vol. 24, pp. 649–650 (1891).

Finar: "Organic Chemistry," vol. 1, 3rd ed. (1959), page 218 (one page), Longmans, Green and Co. (London).

Wagner et al.: "Syn. Org. Chem.," N.Y., J. Wiley & Sons, Inc., 1953, pp. 10, 226.

LEON ZITVER, *Primary Examiner.*

CHARLES B. PARKER, *Examiner.*